United States Patent [19]

Coley et al.

[11] Patent Number: 5,203,542

[45] Date of Patent: Apr. 20, 1993

[54] APPARATUS FOR AN IMPROVED ELECTRIC FENCE WIRE CONSTRUCTION FOR USE WITH INTENSIVE GRAZING

[75] Inventors: James W. Coley; John P. Crichton, both of Cary, N.C.; Marshall H. Eubanks, Millersport, Ohio

[73] Assignee: Delaware Capital Formation, Inc., Apex, N.C.

[21] Appl. No.: 661,391

[22] Filed: Feb. 26, 1991

[51] Int. Cl.$^5$ ............................................... A01K 3/00
[52] U.S. Cl. ........................................ 256/10; 256/23; 174/117 A; 119/20
[58] Field of Search ................ 256/10, 23, 25, 19, 256/32; 119/20, 155, 60; 174/117 F, 117 FF, 117 A, 268, 126.2

[56] References Cited

U.S. PATENT DOCUMENTS

| | | | |
|---|---|---|---|
| 2,808,352 | 10/1957 | Coleman et al. | 174/117 A |
| 3,545,407 | 12/1970 | Moore | 119/20 |
| 3,972,307 | 8/1976 | Marseillan | 119/20 |
| 3,980,277 | 9/1976 | Enoksson | 256/10 |
| 4,111,400 | 9/1978 | Enoksson | 256/10 X |
| 4,300,306 | 11/1981 | Hudgin | 256/10 X |
| 4,460,804 | 7/1984 | Svejkovsky | 174/268 X |
| 4,973,029 | 11/1990 | Robbins, III | 256/10 |
| 5,036,166 | 7/1991 | Monopoli | 256/10 X |

FOREIGN PATENT DOCUMENTS 1164740  3/1964  Fed. Rep. of Germany ........ 256/10

Primary Examiner—Peter M. Cuomo
Attorney, Agent, or Firm—Allegretti & Witcoff, Ltd.

[57] ABSTRACT

An improved electric fence wire construction, especially for intensive grazing, is comprised of an electrically conductive wire core, sandwiched between the two halves of a single strip of thin metallic foil. The foil is folded upon itself, enveloping the wire core. The halves are bonded together by a suitable adhesive which does not inhibit flexibility of the improved wire. The foil serves to purposes, the first being to enhance visibility for the animals. Secondly, the foil offers much more electrically conductive surface area than a bare wire, so a more effective deterrent is presented to the animal. The wire can be used as a component of a permanent electrified perimeter fence, or in a temporary movable electric fence. The improved wire is especially useful in a method of intensive grazing wherein the improved wire is a component of at least two temporary fences that are moved at regular intervals. This allows high densities of animals in a small paddock area for short periods of time, thereby grazing the forageable plants to a uniform degree, and enhancing pasture management by inhibiting overgrowth of undesirable pasture plants such as weeds.

6 Claims, 2 Drawing Sheets

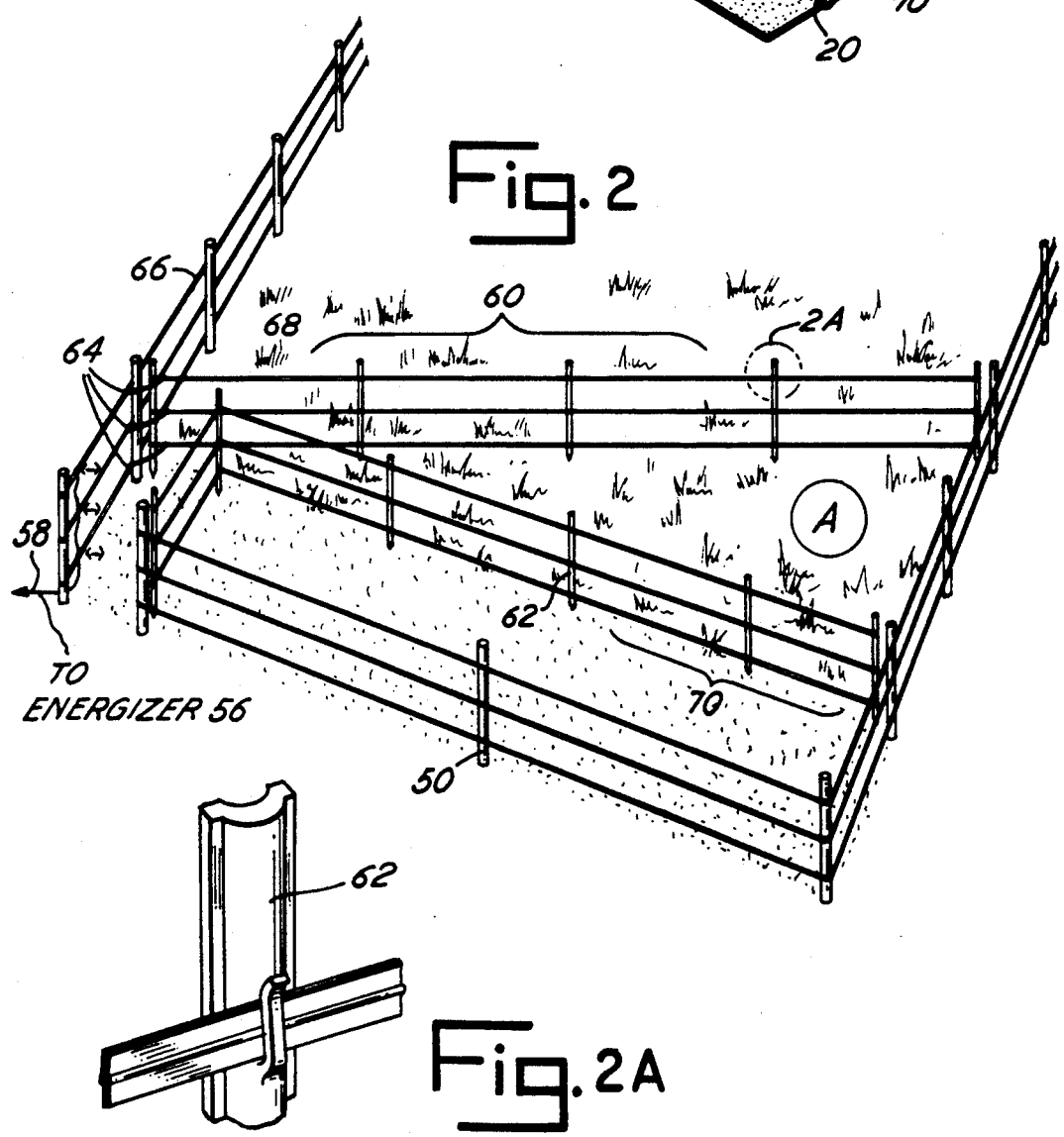

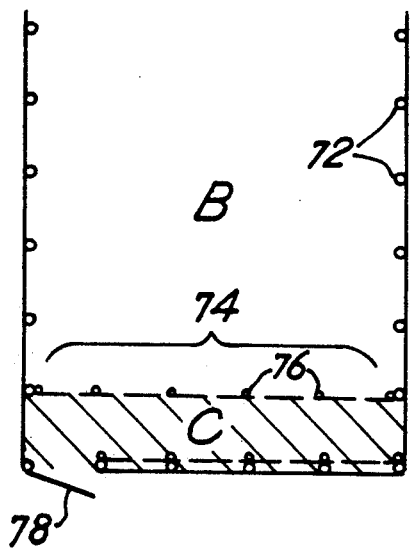
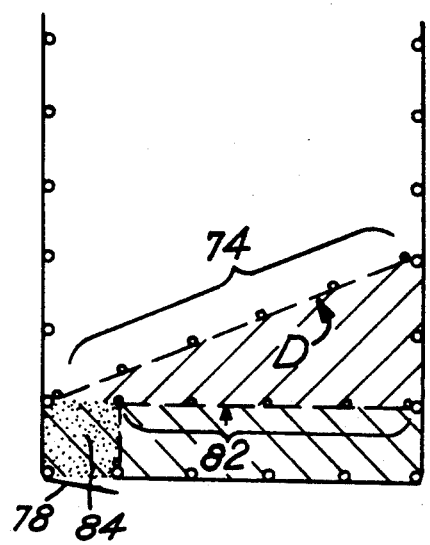
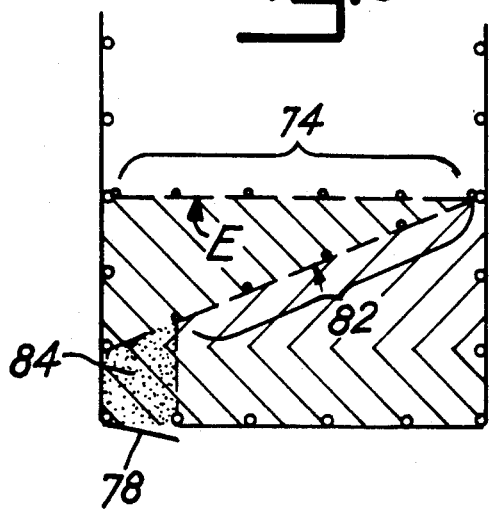
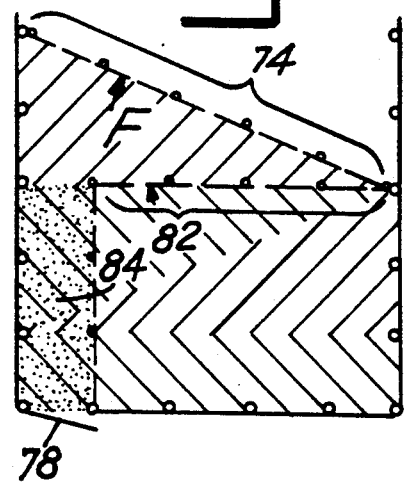

APPARATUS FOR AN IMPROVED ELECTRIC FENCE WIRE CONSTRUCTION FOR USE WITH INTENSIVE GRAZING

BACKGROUND OF THE INVENTION

The present invention relates generally to a method and apparatus for an improved electric fence wire construction for use in intensive grazing, pet control, and other electric fence applications. Particularly, the present invention relates to an improved electrified fence wire construction useful for permanent or temporary fencing in conjunction with intensive grazing of livestock such as cattle, sheep, pigs, etc. The improved fence wire comprises a wire core or cores which support a strip of metallic foil which is highly visible to animals, and also presents an enhanced surface area for conducting electricity.

An important aspect of livestock farming is the ability to provide high quality feed to the animals at all times of the year at the lowest possible price. Two distinct methods are typically used: (a) year-round confinement feeding, and (b) pasturing. Generally, two types of feed are used to maintain the animals in good condition. In the winter, the animals are usually fed stored forage that has been machine harvested during the summer and fall months. Termed silage, this is generally supplemented with grains and vitamins. This is an expensive method of feeding the animals, which has the unwanted result of increasing the farmer's production cost. The second type of feed is associated with the pasturing method. Animals are turned out to pasture during the spring, summer and fall months when pasture plants are creating enough quality forage for the animals to subsist. This is the lowest-cost method of feeding animals, but it cannot be maintained year-round in most areas of the country. Permanent pastures also become run-down, as noted below.

In the past, low-quality, intermittent forage was produced in a continuous-use pasture because of poor grazing management. Typically, conventional grazing is characterized by setting a group of animals loose in a relatively large area to forage the available plants growing within the pasture at random. The animals selectively graze, meaning they eat only what they like, thus changing the distribution of plants in the pasture. The result of this selective foraging is a pasture where the clover and grasses have been selectively and separately cut low, while unpalatable species such as weeds continue growing unimpeded. The weeds then have a competitive advantage over the more desirable species, such as clovers and grasses, and after several years of grazing in this manner a pasture can be depleted of desirable species and overrun with undesirable weeds. This rundown state is directly attributable to infrequent or continuously understocked grazing.

On the other hand, intensive grazing is the method of pasture management wherein larger numbers of animals are grazed together in a small area, thereby raising the density of the animals to a point where the entire pasture is foraged evenly and completely. This does not allow the weeds to develop any competitive advantages because they are eaten after the more desirable species are, thus keeping all the plants at the same growth level. The area foraged will not support the livestock for more than a small amount of time, but this is intentional.

Intensive grazing is accomplished by subdividing a large pasture area into smaller areas called paddocks, and retaining the animals within a particular paddock for a short amount of time, usually from twelve to no longer than forty-eight hours. The animals are then moved to a new paddock, resting the plants within the newly-foraged paddock for an amount of time sufficient to allow the plants to generate substantial new growth. It is critically important that some minimum rest time for the newly foraged paddock is maintained so that new leaf formation can occur. This allows the plants to recover sufficiently so that they are able to grow new leaves and stems for the next round of grazing. In order to allow the desired recovery of the plants, a temporary back fence is located where the old temporary front fence of the prior paddock was. This prevents the animals from returning to the old paddock and foraging the new growth. Farm animals are apt to do so because new growth is more palatable to them. The intensive grazing method has shown itself to be a vastly superior method of grazing farm animals over the conventional technique. Animal production costs are lowered by, first, less dependence on expensive silage feed, and, second, by enhancing the productivity of the pasture. It has been documented that, by resting pasture plants and not allowing reforaging in a short time, the pasture becomes much more productive as a whole. The method is described in detail in *Greener Pastures on Your Side of the Fence*, Murphy, B., 1987, Capital City Press, Montpelier, Vt.

A key to the success of intensive grazing is the ability to create secure new paddocks on a flexible, as-needed basis. One reason for this needed flexibility is that, as environmental conditions change, the rest times for the paddocks vary. For instance, as rainfall and sunlight decrease in the latter part of the summer, plant growth slows, mandating longer rest periods. Another reason is that subdividing pasture land into many paddocks creates a need for a temporary fencing system. This is so because if all permanent fencing was used, the cost would be very high.

The temporary fence used should take into consideration the poor vision of many larger animals, such as horses and cattle. There are several criteria a livestock fence should satisfy to be effective. Visibility can be enhanced by attaching flags or tape to the wire. A temporary movable fence for enclosing paddocks should be both visible to the animals, and also possess a strong deterrent value to contact by both those animals inside the fence, and predators outside the fence. Provision for a deterrent is normally made by electrifying the fence, either continuously or at short intermittent intervals. A commonly used electric fence wire is made of galvanized high-tensile steel wire. While strong and a good transmitter of electricity, it is not a good choice for a temporary fence due to its low visibility, and difficulty of handling.

Temporary flexible electric fencing is not a new idea. There exist several different types of flexible electric fencing commonly used today. See, e.g., *Intensive Grazing Management: Forage, Animals, Men, Profits*, Smith, B., et al., p. 178, 1986, Yu Luen Offset Printing Factory, Ltd., Hong Kong. For instance, polywire is a temporary fence twine made up of strands of polymer twine interwoven with several filaments of stainless steel for conducting the electricity. Polywire is flexible, and therefore easily rewound. Electric current can be applied to the polywire sufficient to provide a deterrent to both livestock and predators. Another form of temporary fence wire is called polytape. Polytape is similar to polywire in that both are made from an ultraviolet resistant plastic interwoven with thin strands of stainless steel wire, and are very flexible. Polytape, because it is wider and tends to flutter in the wind, is more visible than polywire. However, both polytape and polywire have the disadvantage of having high resistance values; therefore, their use is restricted to under 1,000 feet for three strand construction and under 2,000 feet for six strand constructions. Polywire and polytape are also physically weak, and they cannot be uniformly stretched without some risk of breaking the stainless steel filaments that are embedded within the wire or tape. Thus, they cannot be used as permanent perimeter electric fence wire. There is a need for an improved multi-purpose fence wire useful for intensive grazing and capable of service as both permanent and temporary electric fence wire.

SUMMARY OF THE INVENTION

The present invention comprises an improved electrified fence wire construction for use with intensive grazing, and a method of using such fence wire. The improved electric fence wire comprises three basic elements. First, the wire itself is a core strand or strands of electrically conductive wire, said wire having a longitudinal dimension. The second component is at least one thin metallic foil strip which covers the core strand. The metal foil strip is wrapped around the core, enveloping it. In an alternative embodiment, the core is sandwiched between a pair of the foil layers. The metal foil may be bonded to itself or another foil layer by the third element, an adhesive means, said adhesive preserving the flexibility of the fence wire construction. The width of the foil strip measured from one edge of the foil to the opposite edge in the preferred embodiment is generally about one-half inch. This dimension is variable, however, and changes with the particular application. The material of choice for both metal foil covering and the core strand or strands is aluminum.

The present invention also contemplates use of the improved electric fence wire construction as an element of electrified fences used in intensive grazing management. The wire is suitable for both permanent and temporary fencing. Typically, a temporary fence is attached to the permanent perimeter fence on a short-term basis and draws its power from the perimeter fence. Temporary fences are used to subdivide a pasture into paddocks used to confine grazing animals for limited times. Temporary fences are generally comprised of at least four elements: the conductive wire itself, posts for support, means for attaching the wires to the posts, and means for electrifying the fence wire.

The intensive grazing method of pasture management of this invention involves a series of steps. The first step is erecting a permanent perimeter fence in order to define a pasture area. The second step is electrifying the perimeter fence by attaching an energizer to it, and providing a ground for the circuit so that, when an animal touches the wire, the circuit is closed and the animal is shocked. The third step is defining a first paddock area within the pasture by erecting a temporary electrified fence, said fence drawing its power from the perimeter fence by being in electrical contact with the perimeter fence. The next step involves introducing a fixed number of livestock into the paddock area and grazing them for an amount of time sufficient to uniformly reduce all the forageable plant matter, weeds and grasses alike, within that first paddock area. The fifth step entails defining a subsequent paddock area by moving the temporary fence, usually forward, down the pasture. The livestock are then moved into the subsequent paddock area, thus allowing the first paddock area to "rest". This resting of the just-foraged plant matter in the first paddock area allows the plants within that paddock to regrow sufficient leaf surface to resume photosynthesis and build carbohydrates anew. The next step involves defining the rear perimeter of the subsequent paddock area. A temporary back fence is provided that restricts entry of foragers into newly foraged paddocks by barring reentry. The seventh step comprises providing a lane area by adjusting the back fence, the lane being used by the livestock for access to the paddock. The eighth step consists of resting the foraged paddock by restricting access of livestock to it and allowing plant re-growth to occur. The final step consists of repeating the creation of a new paddock and the resting of the old paddocks in order to maximize forageable plant yields of the pasture while providing sufficient forage for the livestock. The time periods for rest and rotation vary, depending upon such factors as the herd density and animal type, season of the year, rainfall, etc.

An object of the present invention is to provide an improved electric fence wire.

A further object of the present invention to provide a fence wire especially useful in intensive grazing.

Another object of the present invention is to provide an improved highly conductive electric fence wire.

Yet a further object of the present invention is to provide an improved electric fence wire with enhanced visibility for both livestock and predators.

Still another object of the present invention is to provide an enhanced electrical fence wire that may be used as either a permanent perimeter fence element, or an element of a temporary fence arrangement.

An additional object of the present invention is to provide a method of using fencing in intensive grazing of livestock.

These and other objects, advantages and features of the present invention will be set forth in greater detail in the description which follows.

BRIEF DESCRIPTION OF THE DRAWINGS

In the detailed description which follows, reference will be made to the drawing wherein like numerals refer to like elements in the various views and wherein:

FIG. 1 is a perspective view of the improved fence wire of the present invention;

FIG. 1A is a cross sectional view of the fence wire of FIG. 1 taken generally along the line 2—2;

FIG. 2 is a perspective view of a pasture utilizing the improved fence wire;

FIG. 2A is a plan view of the improved fence wire, attached to a temporary fence post;

FIG. 3 is a plan view of a pasture demarcated by a permanent electrified fence subdivided by a temporary fence to create a first paddock area;

FIG. 4 is a plan view of a pasture demarcated by a permanent electrified fence, with the temporary fence moved forward to create a second paddock area, and with a back fence being represented, and with provision for a lane;

FIG. 5 is a plan view of a pasture demarcated by a permanent electrified fence, with the temporary fence moved forward yet again to create a third paddock area, and with movement of the back fence being shown; and FIG. 6 is a plan view of a pasture demarcated by a permanent electrified fence, with the temporary fence moved forward yet again to create a fourth paddock area, and with movement of the back fence being shown.

DESCRIPTION OF THE PREFERRED EMBODIMENT

FIGS. 1, 1A and 2A depict the improved fence wire invention in its preferred embodiment. Generally, the invention comprises a single wire core 20 enveloped between the two halves of a single foil strip or layer, 10 and 40, with a layer of adhesive 30 bonding the two halves 10, 40 and the wire core 20 together. Specifically, the layer is a thin layer of aluminum or other malleable electrically conductive material. It is formed in the shape of a flat strip or ribbon, approximately 1½ inches in width, its length being determined by commercial dictates and manufacturing limits. The wire core 20 is positioned substantially in the middle of the strip, with the strip and wire core 20 extending longitudinally in the same direction. In the preferred embodiment, wire core 20 is an aluminum wire, approximately 17 gauge. Other wire, made of a material sufficiently strong to be strung between posts and tensioned, and electrically conductive, may be substituted in its place. The two halves 10, 40 are folded around the wire core 20, the adhesive layer 30 sticking the two halves together to form the improved fence wire of the preferred embodiment.

In an alternative embodiment, the top and bottom foil layers 10 and 40 are separate foil strips. Second foil layer 40 is substantially identical to the first foil layer 10. It is laid atop wire core 20 to form a sandwich with the opposing first foil layer. Adhesive 30 is applied between strips 10, 40 to facilitate bonding of the layers together, and to retain the core wire 20 substantially where placed.

In yet another embodiment, multiple small-gauge wires may be utilized as cores for the electric fence wire. The fence wire may be comprised of a single metal foil strip, folded upon itself and enveloping the wire cores, as in the preferred embodiment, or two separate foil strips may be used.

FIG. 2 is a plan view of a pasture utilizing both permanent and temporary fence using the present invention. As shown, the improved fence wire can be utilized in either permanent or temporary fencing. The permanent perimeter fence comprises a minimum of four elements. The first is fence posts 50 used to anchor the permanent perimeter fence. The post types are well known in the trade, with materials varying from steel to wood. They must be sufficient in length (eight to ten feet) to be buried up to about four feet, and to have three to six feet remaining above the ground. Width dimensions, usually from 4"×4" to 6"×6" for wooden posts, are dependent upon the materials used. Selection criteria mandate that the posts be sufficiently strong to support the wires when they are tensioned. Normal tensioning for aluminum wires is from 100 to 200 pounds per square inch. For high tensile steel it can be much higher. The next element is the improved electric wire of the present invention, and it is used to conduct the high-voltage charge and provide a visual deterrent. The third element is the fastening means for attaching the electrified wire to the posts. Such fastening means include connectors 52 and insulators 54. These are also well known in the art. They must be sufficient to attach and hold the charged wires to the posts, yet not come into electrical contact with the posts. This is because the posts can act as grounds, which would short out the circuit. The fourth element of the electrified wire fence of the present invention is the means for supplying an electric charge 56 through said electric fence. FIG. 2 shows wiring 58 for attaching an energizer device to the fence wires for applying a pulse of high-voltage direct current electricity to the fence wire. Energizers are well-known in the art for their ability to electrify long stretches of fence. Fence chargers, through less efficient, may also be used in this capacity. To complete the electrical circuit, provision for grounding must be made, which is also well known in the art.

An area that is part of a larger pasture, used for pasturing, and is separated from the pasture is known as a paddock. The paddock area A in FIG. 2 is enclosed within the temporary fence 60 shown. Temporary fencing is supported by movable fence posts 62, which are light, easily transported posts suited for moving at short notice. Typically, they are comprised of a light polymer material, with attachment points for the temporary wires. Power for the temporary wires is provided by merely attaching a conductive wire 64 between the permanent fence wire 66 and temporary fence wire 68. Temporary fencing is also used to restrict access to the just-foraged paddock by the erection of a temporary back fence 70, so called because it is behind the temporary front fence. Restriction of livestock from this area is crucial to proper generation of new growth of the plants, which starts in as little as forty-eight hours.

FIGS. 3 through 6 also depict the present invention as it is used in conjunction with a method for intensive grazing. These figures depict the method of intensive grazing in which temporary fences are sequentially moved to create new paddocks. FIG. 3 shows a permanently fenced pasture B. The permanent posts used are represented by the circles 72. Temporary front fence 74 is represented by the dashed line in the lower portion of the pasture near the gate 78. Temporary fencing posts 76 are shown as smaller circles across the dashed lines. A gate 78 to pasture B is located at the bottom left corner of pasture B and serves as a means of access to both the pasture B and the first paddock area C. Livestock or other animals are grazed within this paddock until the forage plants are uniformly eaten. This means that the animals are forced to eat the weeds and other plants they would not otherwise eat if more palatable species were present. If weeds remain while the more palatable and valuable grasses and legumes are eaten and removed, the weeds will be given a selective advantage. They will proliferate, not having to compete with the grasses and legumes for sunlight, and eventually predominate within the pasture.

In order to eliminate the competitive advantage of weeds, the density of the animals is maintained at a comparatively high value, as compared to conventional grazing, thereby ensuring that the animals are forced to eat all of the edible plants, including the weeds. Very obnoxious plants such as thistles or cactus will never be eaten. These must be removed from the pasture manually.

Depending upon the size of the pasture and the density of the herd, when the plants have been uniformly foraged the temporary electric fence is moved to expose additional pasture for the animals. The amount of time the animals remain in the paddock is usually from 12-24 hours. FIG. 4 depicts the temporary fence 74 in this second position, defining a second paddock D. Another temporary fence 82 is added behind the animals, and is termed the temporary back fence. The back fence 82 may be moved at a slower rate than the front fence, so long as it is sufficient to protect new growth, which as previously mentioned can occur in as little as forty-eight hours. Temporary back fence 82 is located substantially where the temporary front fence 74 was previously located. Back fence 82 must, however, leave a lane 84 for the animals to return to the barn, when they need to do so. FIG. 5 shows the formation of a third paddock E by movement of the front fence 74. Temporary back fence 82 is also moved to maintain separation between animals and new growth. Yet another new paddock F is depicted in FIG. 6.

The method depicted in FIGS. 3-5 may be repeated for as long as the plant growth season continues. If there is excess forage production in the paddocks, this should be harvested and stored as silage for winter feeding. This is preferable to having an excess of forage in the paddock because the livestock will then revert to their selective grazing habits and the pasture will again become overrun with weeds.

From the foregoing, it will be appreciated that, although specific embodiments of the invention have been described herein for purposes of illustration, various modifications may be made without deviating from the proper scope or fair meaning of the appended claims.

I claim:

1. An improved electric fence wire construction comprising, in combination:
   a first metal foil strip having a longitudinal dimension;
   a second metal foil strip substantially identical to the first strip;
   at least one wire core of electrically conductive wire having a longitudinal dimension; and
   means for laminating the first strip, the core, and the second strip together with the longitudinal dimensions being generally coincident and with the first strip underlaying the second strip and the strips conductively connected to and enveloping the wire, said two metal foil strips enveloping the conductive wire core to provide a total conductive assembly.

2. The improved electric fence wire of claim 1 wherein said wire core is comprised of aluminum.

3. The improved electric fence wire of claim 1 wherein said wire core is comprised of a plurality of strands.

4. The improved electric fence wire of claim 1 wherein said metal foil strips are comprised of a thin layer of aluminum foil.

5. The improved electric fence wire of claim 1 wherein said metal foil strip is a single strip of material folded to envelop the wire core.

6. The improved electric fence wire of claim 1 wherein said means for laminating includes an adhesive layer disposed upon at least one surface of a metal foil strip.

* * * * *